US011825238B2

(12) United States Patent
Fostiropoulos (10) Patent No.: US 11,825,238 B2
(45) Date of Patent: Nov. 21, 2023

(54) VIDEOCONFERENCE SYSTEM, METHOD FOR TRANSMITTING INFORMATION AND COMPUTER PROGRAM PRODUCT

(71) Applicant: alfaview Video Conferencing Systems GmbH & Co. KG, Karlsruhe (DE)

(72) Inventor: Nikolaos Fostiropoulos, Karlsruhe (DE)

(73) Assignee: Alfaview Video Conferencing Systems GmbH & Co. KG, Karlsruhe (DE)

(*) Notice: Subject to any disclaimer, the term of this patent is extended or adjusted under 35 U.S.C. 154(b) by 0 days.

(21) Appl. No.: 17/543,904

(22) Filed: Dec. 7, 2021

(65) Prior Publication Data

US 2022/0182579 A1    Jun. 9, 2022

(30) Foreign Application Priority Data

Dec. 9, 2020 (DE) .......................... 102020132775.7

(51) Int. Cl.
| | |
|---|---|
| *H04N 7/15* | (2006.01) |
| *H04L 65/75* | (2022.01) |
| *H04L 12/18* | (2006.01) |
| *H04L 65/403* | (2022.01) |

(52) U.S. Cl.
CPC .......... *H04N 7/15* (2013.01); *H04L 12/1813* (2013.01); *H04L 65/403* (2013.01); *H04L 65/75* (2022.05)

(58) Field of Classification Search
CPC combination set(s) only.
See application file for complete search history.

(56) References Cited

U.S. PATENT DOCUMENTS

| | | | |
|---|---|---|---|
| 2003/0112947 A1* | 6/2003 | Cohen ................. | H04L 65/1083 379/202.01 |
| 2005/0231588 A1* | 10/2005 | Yang ....................... | H04N 7/152 375/E7.199 |
| 2006/0120307 A1 | 6/2006 | Sahashi | |
| 2008/0137558 A1* | 6/2008 | Baird ................. | H04L 12/1831 370/260 |

(Continued)

FOREIGN PATENT DOCUMENTS

CN           108650484 A    10/2018

OTHER PUBLICATIONS

21210096.0 German Office Action dated May 2, 2022.

*Primary Examiner* — Phung-Hoang J Nguyen
(74) *Attorney, Agent, or Firm* — Volpe Koenig (57) ABSTRACT

A videoconference system for two-way transmission of video and audio signals using streaming technology between at least three endpoints (EP1-EP3), each having a transmission device and/or a reception device (SE) for audio streams and/or for video streams, includes a first endpoint (EP1) having at least one transmission device (SE) for audio streams/video streams, a second endpoint (EP2) having a reception device for audio streams, and a third endpoint (EP3) having a transmission device for audio streams and a reception device for audio streams. EP1 is connected to EP2 and EP3, in order to transmit a first audio stream (AS1) to EP2 and to EP3 by the transmission device and also transmit a first video stream. EP3 receives the first audio stream (AS1) from EP1 and a request signal (AF) from EP2 and uses this as a basis for producing the second audio stream (AS2) and transmitting it to EP2.

26 Claims, 4 Drawing Sheets

(56) References Cited

U.S. PATENT DOCUMENTS

| | | | |
|---|---|---|---|
| 2010/0182394 A1* | 7/2010 | Zhan ..................... | H04N 7/152 |
| | | | 348/14.01 |
| 2014/0132701 A1 | 5/2014 | Wang et al. | |
| 2016/0170970 A1 | 6/2016 | Lindblom et al. | |

* cited by examiner

VIDEOCONFERENCE SYSTEM, METHOD FOR TRANSMITTING INFORMATION AND COMPUTER PROGRAM PRODUCT

INCORPORATION BY REFERENCE

The following documents are incorporated herein by reference as if fully set forth: German Patent Application No. 10 2020 132 775.7, filed Dec. 9, 2020.

TECHNICAL FIELD

The invention relates to a videoconference system designed for two-way transmission of video and audio signals via streaming technology between at least three endpoints, each of which has a transmission device and/or a reception device for audio streams and/or for video streams.

The invention additionally relates to a method for transmitting information by streaming technology via communication channels between at least three endpoints, each of which has a transmission device and/or a reception device for audio streams and/or for video streams.

Moreover, the invention relates to a computer program product having program instructions stored or storable on a physical data medium.

BACKGROUND

Videoconference systems of the aforementioned type and related transmission methods are known; they are enjoying increasing popularity, in particular owing to the restrictions on everyday and working life during the coronavirus epidemic.

In particular when such videoconference systems are used in the field of education, it is a regular occurrence that individual participants in a videoconference are not readily able to follow an instructor, speaker or presenter because they do not understand or adequately understand his or her language.

SUMMARY

There is therefore a need for a videoconference system or a method for transmitting information that easily allows (simultaneous) translations of a transmitted audio stream to be provided in a simple and flexible manner, so as thereby to allow an increased number of users to participate in videoconferences.

This object is achieved according to the invention by a videoconference system having one or more of the features disclosed herein, by a method for transmitting information having one or more of the features disclosed herein, and by a computer program product having one or more of the features disclosed herein.

Advantageous developments of the subjects of the invention are defined below and in the claims and are hereby explicitly included in the description by way of reference.

A videoconference system according to the invention is designed for two-way transmission of video and audio signals by means of streaming technology between at least three endpoints, each of which has a transmission device and/or a reception device for audio streams and/or for video streams. The videoconference system according to the invention comprises:
  i. at least one first endpoint having at least one transmission device for audio streams and preferably also having a transmission device for video streams;
  ii. at least one second endpoint having at least one reception device for audio streams;
  iii. at least one third endpoint having at least one transmission device for audio streams and a reception device for audio streams;
  in which
  a) the first endpoint is connected to the second endpoint and to the third endpoint, in order to transmit a first audio stream to the second endpoint and to the third endpoint by means of the transmission device for audio streams and in order to also transmit a first video stream, preferably in parallel with the first audio stream, to at least the second endpoint by means of the transmission device for video streams;
  b) the second endpoint has a requesting device, preferably a graphical user interface, and is connected to the third endpoint, in order to selectively request a second audio stream from the third endpoint by means of a request signal produced or producible by the requesting device and to receive said second audio stream from the third endpoint by means of the reception device, which second audio stream is derived from the first audio stream;
  c) the third endpoint is designed to receive the first audio stream from the first endpoint and the request signal from the second endpoint and to take the request signal as a basis for producing the second audio stream and transmitting it to the second endpoint.

A method for transmitting information by means of streaming technology via communication channels between at least three endpoints, each of which has a transmission device and/or a reception device for audio streams and/or for video streams, according to the invention is distinguished in that:
  a) a first endpoint is at least temporarily connected to a second endpoint and to a third endpoint via an applicable communication channel and transmits a first audio stream to the second endpoint and to the third endpoint by means of the transmission device for audio streams, while the first endpoint also transmits a first video stream, preferably in parallel with the first audio stream, to at least the second endpoint by means of the transmission device for video streams;
  b) the second endpoint is at least temporarily connected to the third endpoint via an applicable communication channel, in order to selectively request a second audio stream from the third endpoint by means of a request signal and to receive said second audio stream from the third endpoint, which second audio stream is derived from the first audio stream;
  c) the third endpoint receives the first audio stream from the first endpoint and the request signal from the second endpoint and takes the request signal as a basis for producing the second audio stream from the first audio stream and transmitting it to the second endpoint;
  d) the second endpoint outputs at least the second audio stream.

A computer program product according to the invention comprises program information stored or storable on a physical data medium, the implementation of which program information on a computer system having at least three endpoints, which are connected or connectable via communication channels and each of which has a transmission device and/or a reception device for audio streams and/or for video streams, results in a) a videoconference system for two-way transmission of video and audio signals according to the invention being formed and/or
b) a method for transmitting information between the at least three endpoints according to the invention being carried out.

The computer program product according to the invention does not necessarily have to be in a form stored on a physical data medium; it can also be provided as a download or otherwise in immaterial form. What is important is that implementation of the related program information results in a videoconference system according to the invention being produced or a method according to the invention being carried out.

When the description refers to "endpoints", these are normally computers, in particular and without restriction conventional desktop PCs, that act as endpoints for transmission channels in the videoconference system, this being familiar per se to a person skilled in the art. Such endpoints generally have transmission devices and reception devices in order to be able to receive audio and video streams from other participants associated with the videoconference system and to themselves be able to transmit audio and video streams to other participants associated with the videoconference system. This is also familiar per se to a person skilled in the art. The aforementioned endpoints do not have to be located at a shared location, but rather may be connected to one another (by wire and/or wirelessly) via a computer network, for example the worldwide Internet or an in-house intranet. In this case, they may even be situated at locations that are physically a long way from one another.

To produce the aforementioned audio and video streams, the endpoints of a videoconference system generally comprise applicable recording devices, such as cameras or microphones, this likewise being familiar to a person skilled in the art. The audio and video streams are accordingly output by means of devices suitable for this purpose, such as loudspeakers, headphones or screens (displays). This is also known per se to a person skilled in the art.

Generally, each participant in the videoconference system has his or her own endpoint, that is to say for example his or her own computer. Said endpoint is designed to receive and output the aforementioned audio and video streams from other participants associated with the videoconference system. In addition, each participant in the videoconference system fundamentally has the opportunity to provide his or her own audio and video streams in the videoconference system, which can then be output by other participants.

According to the invention, the videoconference system initially comprises at least one first endpoint, which is designed at least to transmit audio streams. This first endpoint may be the endpoint of an instructor or presenter providing an applicable presentation audio stream (first audio stream) in the videoconference system. A corresponding (first) video stream, which is likewise provided in the videoconference system, preferably exists in parallel therewith.

The second endpoint generally belongs to a "normal" participant in the videoconference system, for example a pupil, who wishes to consume at least the first audio stream. Accordingly, the second endpoint is at least equipped with a reception device for audio streams, in order to be able to receive and (using suitable output devices) accordingly also reproduce the first audio stream.

A preferred use of the videoconference system according to the invention involves the third endpoint being associated with a translator (interpreter), who is supposed to be able to receive an audio stream in a first language, to generate an audio stream therefrom in another language and to provide said audio stream in the videoconference system. Accordingly, the third endpoint has not only a reception device for audio streams but also a transmission device for audio streams.

Additionally according to the invention, the first endpoint is now connected to the second endpoint and to the third endpoint. The first endpoint produces the first audio stream and uses the transmission device to make it available to the second endpoint and to the third endpoint. A first video stream can also be transmitted in parallel therewith.

The second endpoint, that is to say the "normal" participant, has a requesting device, which may be in the form of a graphical user interface, that can be used to produce a so-called request signal and to convey it to the third endpoint, so as in this manner to selectively request a second audio stream from the third endpoint. This second audio stream is preferably a (simultaneous) translation of the first audio stream, which the user of the second endpoint then receives from the third endpoint. However, for the purposes of the present invention, it is sufficient for the second audio stream to be derived from the first audio stream—that is to say it does not necessarily have to be a (simultaneous) translation of the first audio stream, although this is a particularly preferred application of the present invention.

In principle, the invention can also be extended to videoconference systems in which, in addition or as an alternative to the aforementioned first audio stream, a first video stream originating from the first endpoint is converted or translated into a second video stream on applicable request. Furthermore, there is fundamentally the opportunity to also convert the first audio stream not into a further audio stream but rather into a video stream, for example in order to display a corresponding translation into sign language to a participant with impaired hearing. This is also possible independently of the interpreter or translation function described above.

However, a preferred application of the invention provides—as already mentioned—for the second audio stream to be a (simultaneous) translation of the first audio stream, which is transmitted to the second endpoint or to the user thereof on request.

The third endpoint is accordingly designed, according to the invention, to receive the first audio stream (and/or the first video stream) from the first endpoint and the request signal from the second endpoint and to take the request signal as a basis for producing the second audio stream or the second video stream and transmitting it to the second endpoint. In this context, it is possible but not absolutely necessary for the second audio stream or the second video stream to be generated only after the request signal has been sent or received; it may be produced previously but is provided or output at the second endpoint only after the request signal has been sent or received.

The list i) to iii), reproduced earlier, of equipment features of the individual endpoints indicates only those equipment features that are absolutely necessary for the purposes of a videoconference system according to the invention or to carry out the method according to the invention. As a rule, each of the endpoints will have identical equipment features, namely in each case transmission and reception devices for audio streams and transmission and reception devices for video streams, as is known from conventional videoconference systems, in which all participants can see one another and speak to one another.

A first development of the videoconference system according to the invention now provides for the second endpoint to be designed to use the reception device to receive the first audio stream and the second audio stream at the same time and to use a reproduction device to output them at the same time. In this way, the second endpoint or the participant there is also able to reproduce the second audio stream (translation) in parallel with the original audio stream (first audio stream), which means that the listening experience can be optimized because this in particular allows not only the actual sense of what is heard but also nuances in the original to be picked up.

Another development of the videoconference system according to the invention provides for the second endpoint to be designed to output the first audio stream and the second audio stream at different volumes, preferably the first audio stream at a volume that is decreased in comparison with the second audio stream, the first audio stream also being able to be masked out completely. In this way, the participant at the second endpoint has the opportunity to concentrate mainly or completely on the second audio stream, for example in order to be able to follow a presentation in optimum fashion, even if he/she does not understand the original language. This volume adjustment is preferably made automatically when the second audio stream is received; however, there may additionally or alternatively also be an adjustment option for the user. If there are multiple first audio streams (multiple speakers), there may be provision for all of the first audio streams to be output at a volume that is decreased in comparison with the second audio stream while the second audio stream is output.

In yet another development, the videoconference system according to the invention may also have the third endpoint designed to transmit the second audio stream only to a second endpoint from which the request signal was previously received. In other words: only participants that actively request the second audio stream actually have it transmitted to them; by contrast, all other participants follow the first audio stream—in particular if they understand the language of the first audio stream sufficiently well. In this way, the videoconference system is not burdened with unnecessary transmissions, which can have an adverse effect on available bandwidth and transmission quality.

Yet another development of the videoconference system according to the invention provides for the second endpoint to be designed to use the requesting device to selectively cancel the second audio stream at the third endpoint by means of a termination signal produced or producible by the requesting device. Accordingly, the third endpoint is designed to transmit the second audio stream only to a second endpoint from which no termination signal was previously received. In this way, a participant is always able to cancel a previously requested second audio stream again, in particular if it turns out that a translation is not needed. In this way, occupied bandwidths can be freed again in order to improve transmission quality in the videoconference system when required.

Yet another development of the videoconference system according to the invention provides for there to be a plurality of third endpoints that each provide different second audio streams. Based on the exemplary application mentioned at the outset, these may thus be a plurality of third endpoints that each have a different translator in attendance as a user in order to be able to provide translations in different languages, this corresponding to the different second audio streams already mentioned. Moreover, it may be possible for interpreters to translate the translation of another interpreter (relay interpretating). There is additionally provision for the second endpoint to be able to selectively request a determined second audio stream by sending the request signal to a determined third endpoint. That is to say that if for example a first third endpoint provides an English translation while a second third endpoint provides a French translation, the second endpoint or the participant there can purposefully request the second audio stream that corresponds to his language preferences from the relevant third endpoint.

Another development of the videoconference system according to the invention provides for at least the second endpoint to additionally have a reception device for video streams and for at least the third endpoint to additionally have a transmission device for video streams, which transmission device is configured so as, on receiving the request signal from the second endpoint, to also transmit a related second video stream to the second endpoint in parallel with the second audio stream, that is to say preferably a translation. In this way, the participant at the second endpoint is able to see the participant at the third endpoint, that is to say in particular a translator, while he/she receives the second audio stream (the translation) therefrom. This preferably takes place in parallel with reception of the first video stream, which can show a presenter from which the first audio stream originates. The transmission of the second video stream preferably ends together with termination of the transmission of the second audio stream. If the requested translation is a translation into sign language, sometimes only a transmission of the second video stream (without the second audio stream) is provided.

In a development of the videoconference system according to the invention, there may also be provision for the second endpoint to be configured so as, before sending the request signal, to use the reception device for video streams or an appropriate output device to display a (still) image, preferably a symbol image, which image displays an attribute of the third endpoint and/or of the second audio stream. That is to say that if for example the third endpoint is configured to provide a translation of the first audio stream into the French language, the aforementioned image could be a French flag or the Eiffel Tower so that a user at the second endpoint is readily able to recognize what type of second audio stream he will receive as a result of his request.

Preferably, the third endpoint (the interpreter) unlocks himself or is provided with an appropriate unlocking device, i.e. an appropriate control element. As soon as he is ready to interpret, he activates himself for the other participants (second endpoints) by using the unlocking device and then becomes visible as a voice channel (in particular in the form of the aforementioned (still) image).

This can be displayed at a second endpoint (participant desk) in a display sidebar, for example. The relevant participant can then switch to different voice channels or select applicable audio streams; these are preferably displayed using typical symbols/flags of the respective nation (e.g. French—Eiffel Tower), as already mentioned above.

In yet another development, the videoconference system according to the invention may provide for a number of second audio streams that can be received at the second endpoint at the same time to be limited, preferably to one (1). In this way, unnecessary use of bandwidths can be avoided, because a user of the second endpoint will generally be unable to follow more than one second audio stream at the same time. The invention is by no means necessarily limited to the number one in this context, however.

Additionally, a particular embodiment of the videoconference system according to the invention may have provision for the third endpoint to have a display device that displays a number of second endpoints from which the request signal was received and that receive the second audio stream at a given time. In the application outlined at the outset, that is to say that for example the translator at the third endpoint can tell how many participants (at second endpoints) are currently receiving the second audio stream (e.g. the requested translation). As soon as the number becomes zero (0), there is fundamentally the opportunity for the translator at the third endpoint to stop his or her translation activity in order to save applicable resources. In this context, there is then also the opportunity for a translator who is able to translate into multiple languages to provide his or her capabilities on another voice channel, i.e. in order to produce another required second audio stream.

The aforementioned display device does not have to be restricted to the third endpoint, but rather may be available at all endpoints.

Another development of the videoconference system according to the invention provides for a third endpoint to be configured to detect the reception of a further request signal at a further third endpoint and to take the further request signal as a basis for producing a further second audio stream and transmitting it to that second endpoint from which second endpoint the further request signal originated. This builds on the circumstance already outlined earlier according to which a further second audio stream, i.e. for example a further translation into another language, is required in a videoconference system as described. If the third endpoint (the translator) is able to detect the reception of such a further request signal or alternatively the sending of such a further request signal, there is fundamentally the opportunity for him/her to provide an applicable further second audio stream (an additional translation).

In a development of this idea, there may be provision for the aforementioned further second audio stream (the additional translation) to be producible only if no second audio stream (the first translation) is being produced. In other words: a third endpoint (translator) already producing a second audio stream (a translation) cannot simply terminate said second audio stream in order to optionally produce a further second audio stream (another translation). In principle, however, there is inherently the opportunity to abort a second audio stream that is being produced if there is increased demand for a further second audio stream and there are currently insufficient resources available to produce both second audio streams.

Finally, a particularly preferred embodiment of the videoconference system according to the invention provides for the second audio stream and/or the further second audio stream to be a simultaneous translation of the first audio stream, preferably a human translation. This has already repeatedly been suggested earlier when discussing the preferred application of the videoconference system according to the invention. The invention is not restricted to simultaneous translations and/or human translations, however, but rather specifically also includes machine translations as well.

Based on the method according to the invention, a first development thereof provides for the second endpoint to receive the first audio stream and the second audio stream at the same time and to output them at the same time. This has already been suggested earlier in reference to the videoconference system and the possible embodiments thereof.

Moreover, a development of the method according to the invention may have provision for the second endpoint to (automatically) output the first audio stream and the second audio stream at different volumes, preferably the first audio stream at a volume that is decreased in comparison with the second audio stream. This too has already been suggested earlier with reference to the videoconference system.

Another development of the method according to the invention provides for the third endpoint to transmit the second audio stream only to a second endpoint from which the request signal was received. This aspect too has already been discussed earlier in reference to the videoconference system.

Additionally, a development of the method according to the invention may provide for the second endpoint to selectively cancel the second audio stream at the third endpoint by means of a termination signal, while the third endpoint transmits the second audio stream only to a second endpoint from which no termination signal was previously received. This aspect too has already been discussed in detail earlier.

Yet another development of the method according to the invention provides for a plurality of third endpoints to each provide different second audio streams, wherein the second endpoint selectively requests a determined second audio stream by sending the request signal to a determined third endpoint. In this way, a participant or user at the second endpoint can selectively request determined second audio streams from the respective related third endpoints, said second audio streams preferably being different translation languages. This too has already been discussed in detail earlier. A given third endpoint can naturally also offer more than one second audio stream, from which the participant selects. As a rule, this selection option no longer exists as soon as a determined second audio stream has been selected by one (or other) participant, because a human translator cannot produce more than one second audio stream at the same time.

Another development of the method according to the invention provides for the third endpoint, on receiving the request signal from the second endpoint, to also transmit a second video stream to the second endpoint in parallel with the second audio stream. In this way, there is in particular the opportunity for a participant at the second endpoint to also be able to see the source of the second audio stream (a translation), which can increase acceptance and promote comprehension. It has also already been suggested that the second video stream can be transmitted in parallel with the first video stream, which generally originates from the instructor or presenter. When the second audio stream is terminated (cancelled), transmission or reception of the second video stream generally also ends.

The second video stream of the third endpoint or alternatively an image of the participant at the third endpoint (the interpreter) preferably appears only when said participant starts to translate, i.e. to speak. Only when he is actually working, i.e. translating, is the relevant participant discernible in the virtual room.

The third endpoint, before being activated by a request signal from a participant, is in particular preferably only visible in the participant desk as a voice channel.

In order to facilitate selection of a third endpoint for a participant or user at the second endpoint, yet another development of the method according to the invention may also have provision for the second endpoint, before sending the request signal, to display a (still) image, preferably a symbol image, for the third endpoint, which image indicates an attribute of the third endpoint and/or of the second audio stream. It has already been suggested that this image may be a national flag symbolizing a language of the second audio stream, for example.

Moreover, a development of the method according to the invention may also have provision for a number of second audio streams received at the second endpoint at the same time to be limited, preferably to one (1). This allows system resources to be saved or used in an appropriate manner, which has already been suggested.

Another development of the method according to the invention provides for the third endpoint to display to its user (translator) a number of second endpoints from which the request signal was received and that receive the second audio stream at a given time. That is to say that when for example a translator at the third endpoint produces the second audio stream, he/she can always see how many participants at second endpoints are currently using the second audio stream. In this way, there is the opportunity to react if for example the aforementioned number falls to zero (0).

An applicable development of the method according to the invention may also have provision for the third endpoint to detect the reception of the further request signal at a further third endpoint, or to display said reception to the user there, and to take the further request signal as a basis for producing a further second audio stream and transmitting it to that second endpoint from which second endpoint the further request signal originated. This aspect too has already been discussed in detail earlier and can in particular relate to the case in which a translator at the third endpoint detects that participants at a second endpoint have requested a further second audio stream, that is to say for example a translation of the first audio stream into another language. Under certain circumstances, the third endpoint, or the translator, can react thereto by virtue of his/her purposefully producing and providing a further second audio stream. This aspect too has already been discussed in detail earlier.

There may preferably be provision for a given third endpoint, that is to say for example a translator, to produce only one second audio stream at a given time, since the translator will, as a rule, be unable to provide two different translations at the same time. In this context, the further second audio stream (that is to say the other translation) is highly preferably produced only if no second audio stream (that is to say the original translation) is being produced. This relates to the case in which the translator discovers that a second audio stream is currently not needed, but a further second audio stream is needed instead. If he or she is capable of this, he/she can then provide the aforementioned further second audio stream. This will be the case in particular if the number of participants who had originally requested the second audio stream has fallen to zero. The invention is by no means restricted to such a case, however.

As has already been described for the videoconference system earlier, another development of the method according to the invention can comprise the second audio stream and/or the further second audio stream being produced by a simultaneous translation of the first audio stream, preferably by a human translation. It will be expressly pointed out at this juncture that the invention is by no means restricted to the provision of human translations. In principle, there is the opportunity for the third endpoint to provide a machine translation in addition or as an alternative to a human translation, provided that the quality of said machine translation is acceptable for a given application. There is also the possibility of machine translation systems gaining further in quality in future, which means that the present invention can then preferably involve the use of machine translations.

Another embodiment of the method according to the invention provides for a user of the second endpoint to trigger the request signal and/or the termination signal, preferably by way of a graphical user interface. The applicable input can be made using auxiliary devices, such as a mouse or the like, or directly by touching an appropriately touch-sensitive display. Alternatively, voice commands or gesture control are possible. The invention is not restricted to one particular mode of input here.

The third endpoint may advantageously be equipped with a hearing protection device for the participant there (interpreter), e.g. against feedback. To protect the participant against loud whistling sounds or other loud and suddenly occurring audible signals, the hearing protection device is designed to automatically filter out volume peaks from an audio signal (audio stream) arriving at the third endpoint. This makes it possible to prevent for example hearing loss, acute acoustic trauma or other health-related harm for interpreters.

Moreover, the third endpoint (the interpreter) may have the following control devices or be appropriately equipped, for example in the form of an interpreter desk in a display sidebar, with the following control elements/functions, which are not restricted to the specific designs indicated merely by way of example:

Mute key: if the interpreter needs to clear his or her throat, they can quickly interrupt transmission of their audio stream.

Volume slide control: the interpreter can alter the volume of the keynote speaker (participant at the first endpoint; first audio stream). In the case of relay interpretation (interpreter interprets from the interpretation of another interpreter), the volume of the first interpretation can accordingly be regulated.

Private voice channel between two interpreters: two interpreters (participants at third endpoints) can talk to one another at the push of a button without the other participants associated with the videoconference system hearing.

Automatic handover to another interpreter: before an interpreter leaves the virtual room (i.e. the videoconference system), he can automatically hand over to another interpreter at the push of a button.

The interpreter can adjust the frequency range used—in particular for the first audio stream arriving with him—so that he can understand everything clearly above his own voice.

BRIEF DESCRIPTION OF THE DRAWINGS

Further attributes and advantages of the invention will emerge from the description of exemplary embodiments below with reference to the drawing.

DETAILED DESCRIPTION

Male and female forms of terms such as "participant" or "user" are used with equal validity below. The intention is always for both forms to be included—even if not indicated explicitly.

Figure 1:
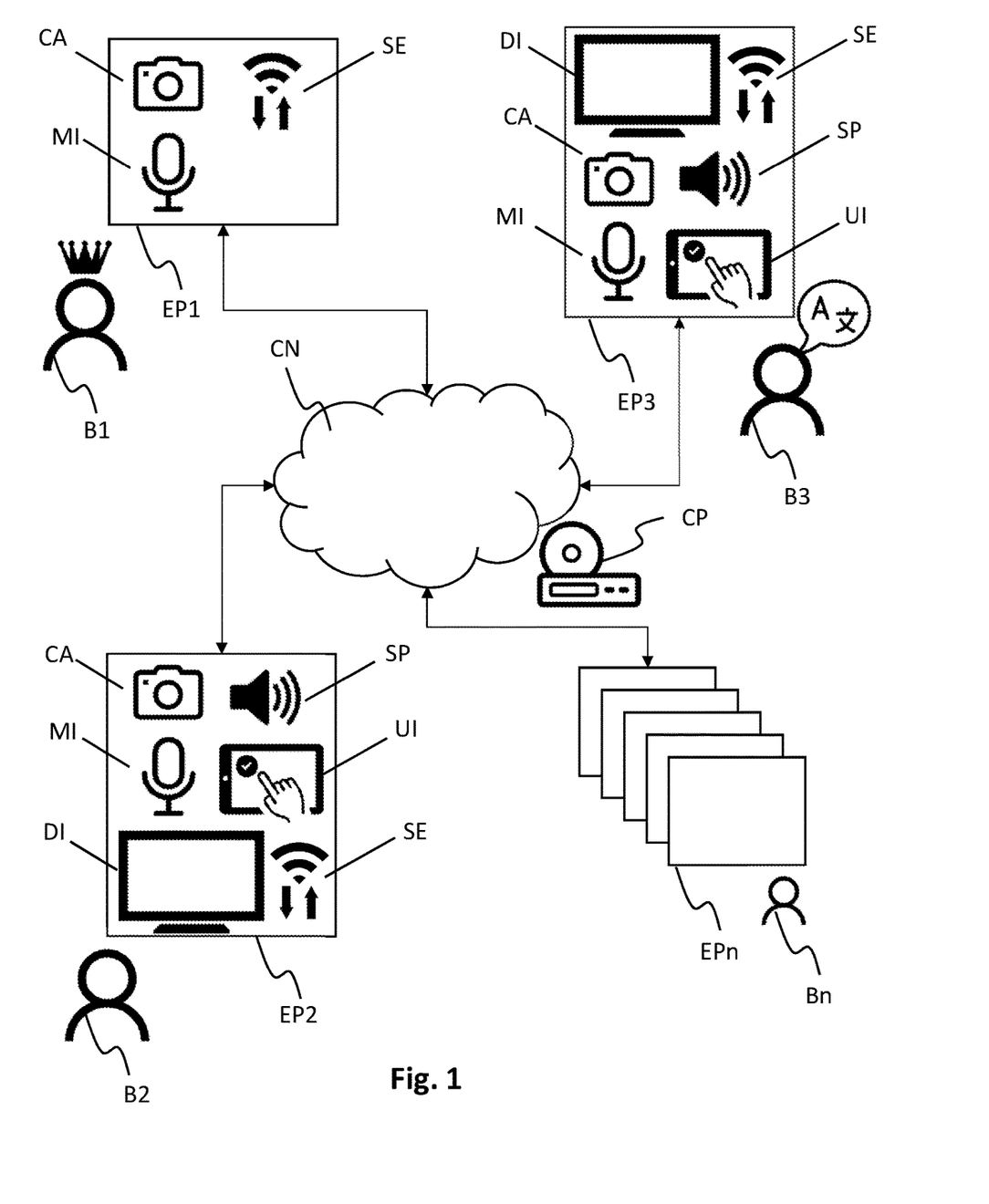
FIG. 1 schematically shows the design of a videoconference system according to the invention.

FIG. 1 shows a videoconference system according to the invention with a series of participants arranged at different endpoints of the videoconference system. In principle, all of the endpoints of the videoconference system may be embodied or equipped in a technically equivalent manner; this is not shown in the figures—here the technical equipment shown for the individual endpoints is restricted to the particular equipment required according to the invention or in developments.

The technical embodiment of the individual endpoints of the videoconference system has also already been presented earlier in the general part of the description.

As shown in FIG. 1, the videoconference system initially comprises a first endpoint EP1, which is associated with an instructor, a presenter or generally with a VIP user. This user is denoted by the reference sign B1 and a crown in FIG. 1. Accordingly, a second endpoint EP2 is associated with a second user B2, and a third endpoint EP3 is associated with a third user B3. Further endpoints EPn can exist that may accordingly each in turn have an associated user Bn. In principle, the number of endpoints of the videoconference system is unlimited within the constraints of the technical capabilities.

The aforementioned endpoints EP1-EPn are connected to one another via a computer network CN. The computer network CN is preferably the worldwide Internet or an in-house intranet. In principle, however, the invention is not restricted to one particular type of computer network CN.

The individual endpoints EP1-EPn are able to use the computer network CN to interchange data streams, for the purposes of the present invention preferably audio streams (sound) and video streams (image). To be able to produce such data streams, all of the endpoints (EP1-EPn) have a camera CA and a microphone MI. Furthermore, all of the endpoints EP1-EPn have transmission and reception devices for the aforementioned data streams, this being symbolized by reference signs SE in FIG. 1. These may, but do not have to, be in wireless form. At least the second endpoint EP2 and the third endpoint EP3 (and generally also the further endpoints EPn) additionally have suitable output/reproduction devices for received data streams, presented here in the form of a display DI for received video streams and a loudspeaker SP for received audio streams. Furthermore, at least the second endpoint EP2 and the third endpoint EP3 have a user interface UI, which may be in the form of a graphical user interface (GUI), as symbolized in FIG. 1, in particular.

Reference sign CP is used to show a data medium and a corresponding reader, this being intended to illustrate that applicable program instructions (program code) required for configuring the videoconference system and its components or for carrying out a method according to the invention using the videoconference system shown may be stored or storable on a corresponding data medium, in order to equip (set up) the videoconference system as appropriate. However, it is absolutely not necessary for the aforementioned program instructions to be present on a physical data medium; there is alternatively or additionally the possibility of a download in appropriately immaterial form, e.g. from the Internet.

It has already been suggested that user B1 may be an instructor or presenter. In a preferred application of the videoconference system, the user B2 is a "normal" participant, for example a trainee, who wishes to follow a presentation by the presenter B1. User B3 is a translator in this case, as shown symbolically using the speech bubble in FIG. 1. The distribution of roles and the processes associated therewith will be discussed in more detail later on.

The further users or participants Bn may in particular be further "normal" participants corresponding to participant B2 or may be further lecturers corresponding to participant B1. Later on, however, there will also be a description of applications according to which at least some of the further participants or users Bn may also be further translators corresponding to user B3.

Figure 2:
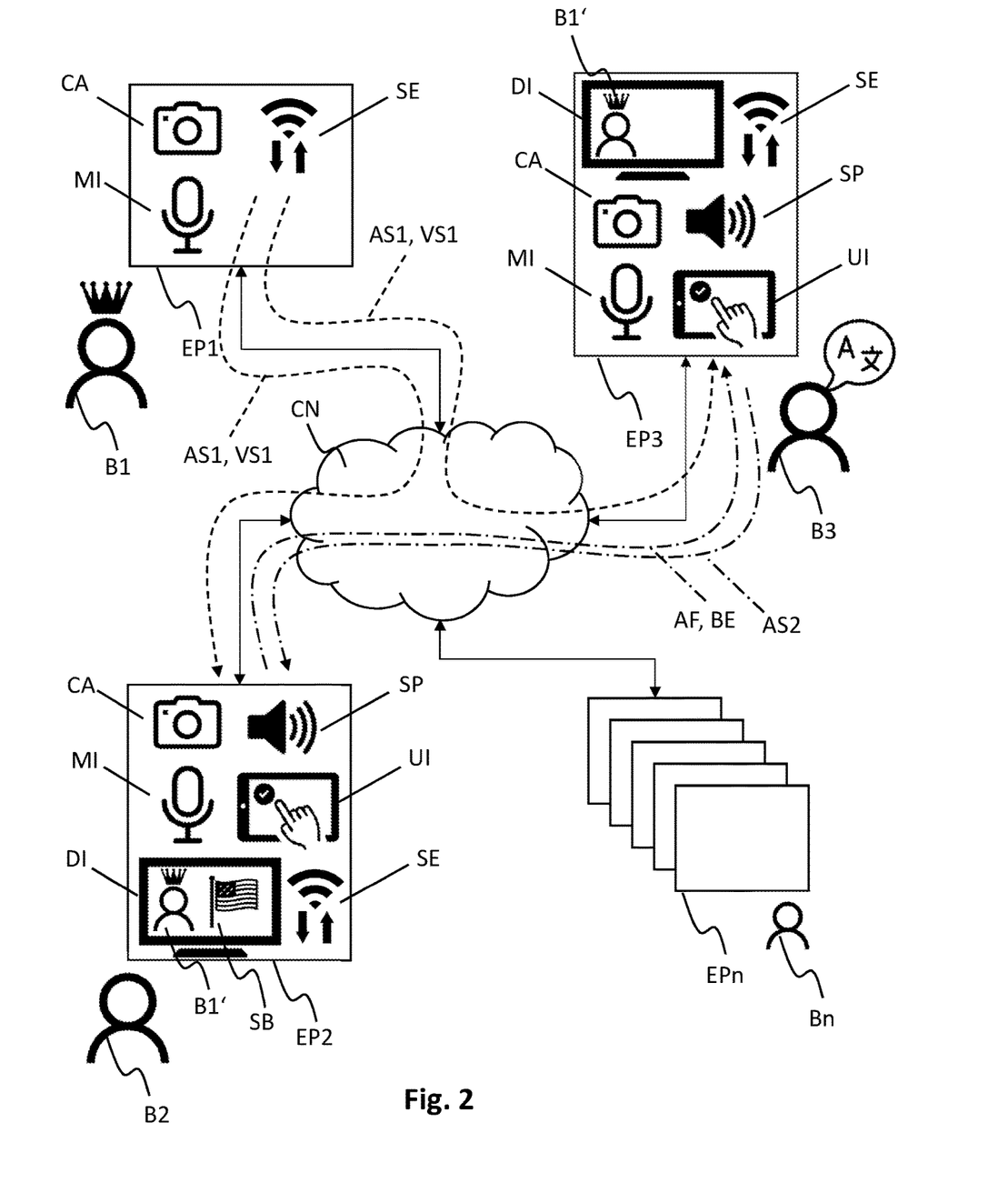
FIG. 2 shows the use of the videoconference system shown in FIG. 1 for carrying out a method according to the invention.

FIG. 2 shows how the videoconference system shown in FIG. 1 can be used advantageously. This results in a method according to the invention for transmitting information, here in particular the audio and video streams mentioned, by means of streaming technology via communication channels, which communication channels are formed between the at least three endpoints EP1 to EP3.

During a presentation by user B1, the first endpoint EP1 is at least temporarily, advantageously permanently, connected to the second endpoint EP2 and to the third endpoint EP3 via an applicable communication channel. The first endpoint EP1 transmits a first audio stream to the second endpoint EP2 and to the third endpoint EP3 by means of the transmission device SE. This is shown in the figure using the reference sign AS1. The second endpoint EP2 and the third endpoint EP3 output the audio stream AS1 by means of their respective reproduction device SP. In parallel, the first endpoint EP1 also transmits a first video stream VS1 to the second endpoint EP2 and to the third endpoint EP3 by means of the transmission device SE. This is symbolized in FIG. 2 by virtue of the display DI of the second endpoint EP2 and the display of the third endpoint EP3 each showing an image B1' of the presenter B1. The first audio stream AS1 and the first video stream VS1 are transmitted along the communication channels between the endpoints via the computer network CN, as symbolized by dashed lines in FIG. 2. Participant or user B2 and participant or user B3 can therefore see and hear the user (presenter) B1.

The display DI of user B2 at the second endpoint EP2 displays, at reference sign SB, a symbol image for a second audio stream AS2, which the participant or user B2 can request from the third endpoint EP3 or the related user B3 (translator) by using a request signal AF. For this purpose, user B2 uses his user interface UI to make an applicable request or makes a related input, whereupon endpoint EP2 transmits the request signal AF to the endpoint EP3. After receiving the request signal AF, one possibility is that translator B3 starts to produce the requested second audio stream AS2 (using the microphone MI), whereupon the relevant endpoint EP3 transmits the audio stream AS2 to the second endpoint EP2, which is discussed in more detail below with reference to FIG. 3. Alternatively, user B3 produces the second audio stream AS2 from the outset, that is to say from the beginning of the presentation by user B1; however, said second audio stream is made available to the user B2 only on request (request signal AF). In FIG. 2, the request signal AF and the second audio stream AS2 are denoted by means of dash-dot lines. The transmission again takes place along applicable communication channels via the computer network CN.

The further users Bn can also, from their endpoints EPn, request an applicable second audio stream AS2 from the relevant endpoint EP3 by means of a request signal AF, this not being shown in FIG. 2. It goes without saying that there may also be further endpoints similar to the third endpoint EP3 in the videoconference system, which (can) each output different second audio streams AS2. This would then be displayed on the display DI of the user B2 or the further users Bn by means of various symbol images SB, analogously to FIG. 2. The applicable selection by way of the user interface UI allows the relevant users B2, Bn to select and request the particular desired second audio stream AS2.

Figure 3:
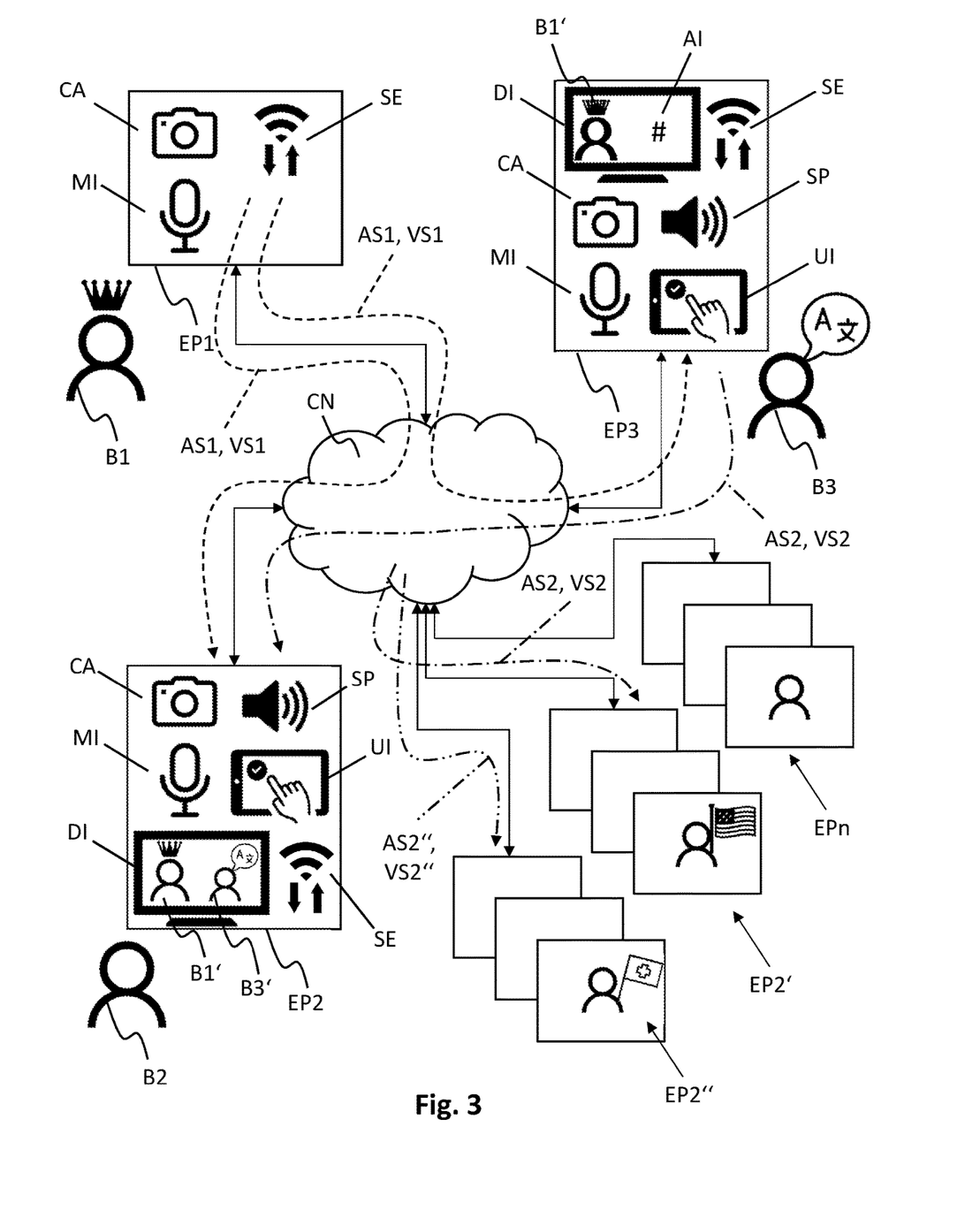
FIG. 3 likewise shows the use of the videoconference system shown in FIG. 1 for carrying out a method according to the invention.

FIG. 3 schematically shows what the user B2 at the second endpoint EP2 sees or hears following execution of the method steps shown in FIG. 2:

He or she continues to receive the first audio stream AS1 and the first video stream VS1 from the presenter B1, or from the endpoint EP1. A corresponding output is provided via the loudspeaker SP and the display DI, as already explained. Moreover, user B2 at the endpoint EP2 receives the second audio stream AS2 from the third endpoint EP3. As shown in the illustration in FIG. 3, the third endpoint EP3, or the user (translator) B3 there, additionally uses his camera CA to produce a second video stream VS2 and transmits said second video stream together with the second audio stream AS2 to the second endpoint EP2. Endpoint EP2 uses the display DI to output at least both the first video stream VS1 and the second video stream VS2, as shown symbolically (reference signs B1', B3').

The display DI of the endpoint EP3 displays not only the first video stream VS1 (reference sign B1') at reference sign AI but also information relating to a number of those (second) endpoints that receive the second audio stream AS2 at the indicated time. There exist in the present case a series of further (second) endpoints EP2' that receive the second audio stream AS2, as symbolized by way of the relevant flag (cf. FIG. 2) in FIG. 3. In addition, there exist a series of other (second) endpoints EP2" that receive a further second audio stream AS2", which originates from a further third endpoint (not shown) similar to endpoint EP3. The transmission paths for the aforementioned (further) second audio streams AS2, AS2" are not shown completely in FIG. 3 for reasons of clarity.

The outlined situation is symbolized in FIG. 3 by another flag at the endpoints EP2", which represents another language and accordingly another second audio stream AS2".

Although this is likewise not shown in FIG. 3 for reasons of clarity, the second endpoints EP2', EP2" continue to receive the first audio stream AS1 and the first video stream VS1 from the endpoint EP1. Additionally, the second video stream VS2 is transmitted from the third endpoint EP3, as already noted. In the case of the endpoints EP2" that receive a further second audio stream AS2", this is accordingly a related further second video stream VS2".

Those endpoints EPn that have not requested a (further) second audio stream conventionally receive only the first audio stream AS1 and the first video stream VS1, this not being shown further in FIG. 3 for reasons of clarity.

It has already been suggested that in principle all endpoints of the videoconference system may be in technically similar form, this not being shown explicitly in the figures for reasons of clarity. In principle, however, there is nothing to discourage using endpoints with technically different equipment to set up the videoconference system described, provided that the individual endpoints have the particular capabilities required for participating in the videoconference system.

It has already been suggested that in particular the endpoint EP2 receives both the first audio stream AS1 and the requested second audio stream AS2. The two audio streams AS1, AS2 are preferably output via the loudspeaker SP of the reproduction device at the same time, but with the requested second audio stream AS2 preferably being automatically output louder than the first audio stream AS1. If required, the user B2 can adjust this using the user interface UI.

Referring again to FIG. 2, it will also be noted that the user B2 at the endpoint EP2, analogously to requesting the second audio stream AS2 using the request signal AF, can also transmit a termination signal BE to the third endpoint EP. After receiving such a termination signal BE, the third endpoint EP3 stops transmitting the second audio stream AS2 to the endpoint EP2, or a corresponding provision. The videoconference system then returns to the (initial) state shown in FIG. 2 (with the displayed symbol image SB at the endpoint EP2). In such a case, the value displayed at reference sign AI at the endpoint EP3, as shown in FIG. 3, is reduced by one (1). The third user B3 is thus always able to tell whether participants B2 are still reliant on the second audio stream AS2, and could, if AI=0, stop producing the second audio stream AS2 if necessary (for example in order to produce a further audio stream AS2" as shown in FIG. 3 if he/she is able).

The possible function of the user interface UI of the endpoint EP3 has not been discussed further up to now. The aforementioned user interface UI advantageously allows the user (participant) B3, in the application outlined in the present case the translator, to select a so-called voice channel, that is to say at least one type or attribute of the second audio stream AS2 or AS2" that he/she produces. This allows one and the same user B3 to advantageously provide different second audio streams AS2, AS2', which preferably cannot take place at the same time. That is to say that if for example the translator B3 recognizes from the display at reference sign AI (FIG. 3) that the second audio stream AS2 is no longer needed, he/she can provide another (further) second audio stream AS2" as required and display it in the videoconference system via the user interface UI (as a result of which for example the displayed symbol images SB accommodate accordingly, preferably automatically).

It has already been suggested elsewhere that the videoconference system described functions advantageously even if the third endpoint EP3 provides only a second video stream VS2, for example containing a translation of the first audio stream AS1 into a sign language, instead of the second audio stream AS2. This is not shown explicitly in the figures, but is expressly an advantageous alternative embodiment of the described invention.

Figure 4:
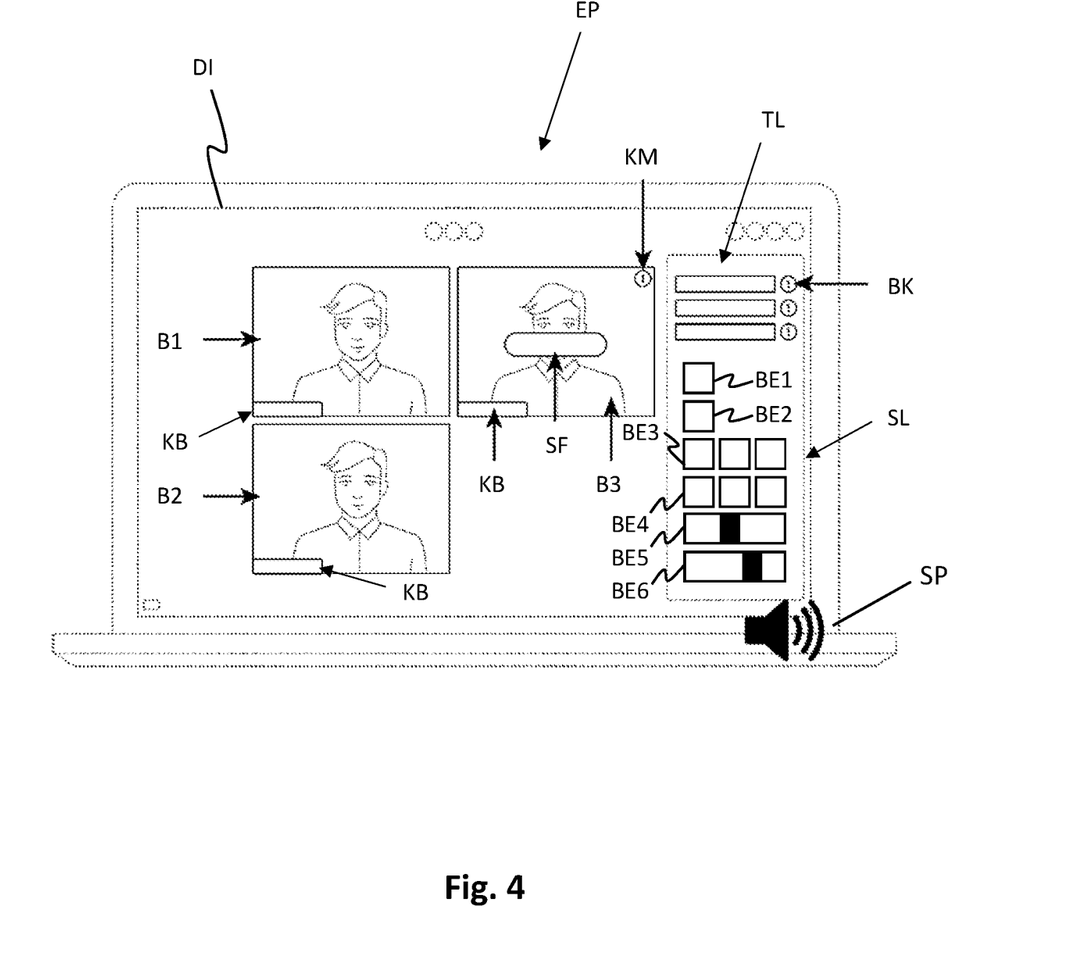
FIG. 4 shows a possible embodiment of a user interface for the purposes of a videoconference system according to the invention.

Finally, FIG. 4 shows a possible display on the display DI (cf. FIGS. 1 to 3) of a participant in a videoconference conducted using the videoconference system described above. As shown in the exemplary illustration in FIG. 4, three participants are again present, these being denoted by the reference signs B1 to B3 in line with FIGS. 1 to 3. As a person skilled in the art can easily tell, this is a simplification, because the functions described can naturally also be transferred to larger numbers of participants.

In FIG. 4, the device that the relevant participant uses to take part in the videoconference, in the present case a notebook or laptop computer, without restriction, is denoted by the reference sign EP (endpoint) in line with FIGS. 1 to 3.

As has already been described above with reference to FIGS. 1 to 3, each of the three participants B1 to B3 has been assigned a determined participant role in advance of the videoconference, as a result of which the particular associated functions, which were already discussed in detail with reference to FIGS. 1 to 3, have been unlocked. The respective role is evident as a result of appropriate labeling and description at reference sign KB, which is superimposed on the respective video image of the participant B1 to B3.

In the example shown in FIG. 4, the participant B1 has the role of lecturer, the participant B3 has the role of interpreter and the participant B2 wishes to follow the presentation as a listener.

As soon as the lecturer B1 starts to speak, the interpreter B3 preferably begins his activity and likewise starts to speak or to translate. Accordingly, the lecturer B1 produces the first audio stream AS1 (cf. FIGS. 1 to 3), while the interpreter B3 produces the related second audio stream AS2 (cf. FIGS. 1 to 3). On the basis of the role assigned to the interpreter, the audio output therefrom is initially inaudible to user B2, because the aforementioned audio output is not needed by every participant.

In order to make the interpreter B3 audible, the relevant listener B2 activates the audio output from the interpreter by using a context menu KM on his graphical user interface, that is to say transmits the request signal, as already described. As shown in FIG. 4, the context menu KM is superimposed on the video image of the interpreter B3. The context menu KM is triggered by clicking on it with the mouse (or alternatively by touch, voice command or the like) and then shows a button SF for activating or deactivating the interpreter function. This corresponds in terms of function to the request signal or termination signal described in detail earlier. The context menu KM is additionally also retrievable by way of a so-called user context BK together with a list of participants TL in a (display) sidebar SL that is displayed.

As soon as the listener B2 has activated the interpreter function, the audio stream AS2 originating from the interpreter B3 (cf. FIGS. 1 to 3) is output by means of the loudspeaker SP, specifically at the same time as the audio stream AS1 originating from the lecturer B1 (cf. FIGS. 1 to 3) and possibly at the same time as further audio streams that may originate from other participants associated with the videoconference. The volume of the audio outputs from all of the participants present, including the lecturer B1, is distinctly reduced in comparison with the interpreter B3, and as such covered by the audio output from the interpreter B3. At the same time, the EP also receives a video stream from the interpreter B3 (video stream VS2, cf. FIGS. 2 and 3) and outputs said video stream together with the video image of the lecturer B1 (video stream VS1, cf. FIGS. 2 and 3). Furthermore, a video image of the user B2 is displayed, as is sufficiently well known from conventional videoconference systems.

There may—as already mentioned—also be further users in category B1 present. In this instance, it is advantageously the case that the user B2 does not hear all of the speakers (user B1) at full volume again until the request signal AF is deactivated. While the request signal AF is activated, it is advantageously always possible to hear interpreter B3 at full volume, regardless of who speaks.

It has already been suggested that multiple interpreters B3 can take part in a videoconference at the same time, but advantageously only one interpreter B3 per participant B2 can ever be activated at the same time.

Instead of an image of the interpreter B3, there may initially, that is to say before the interpreter function is activated, also be a symbol image displayed, as described in detail earlier; the image of the interpreter B3 appears only when the interpreter function is activated or while it is activated.

The interpreter B3 can have additional selection options displayed on his display DI, in particular a number of current recipients of the audio stream he produces and/or options for language selection, this already having been suggested in detail earlier.

FIG. 4 primarily relates to the visible display or user interface at an endpoint EP of the videoconference system described. In regard to the design-related embodiment of the videoconference system and the method-related processes within said videoconference system, reference will be made to the description of FIGS. 1 to 3 above. In particular the interpreter B3 has a hearing protection device, which has already been suggested. This may be integrated in the relevant endpoint (not shown).

Specifically the interpreter B3 can have further control elements BE1-BE6 available on the display, e.g. in the sidebar, which have already been suggested in the general part of the description.

BE1 denotes an unlocking device that the third endpoint (the interpreter) uses to unlock himself as soon as he is ready to interpret.

BE2 denotes a mute key that the interpreter can use to quickly interrupt (mute) transmission of his audio stream if he needs to clear his throat.

BE3 denotes a control element for automatically opening a private voice channel between two interpreters: two interpreters (participants at third endpoints) can talk to one another at the push of a button without the other participants associated with the videoconference system hearing. As shown in FIG. 4, a corresponding button or the like may be present for every further interpreter.

BE4 denotes a control element for automatically handing over to another interpreter: before an interpreter leaves the virtual room (i.e. the videoconference system), he can automatically hand over to another interpreter at the push of a button or the like. As shown in FIG. 4, a corresponding button or the like may be present for every further interpreter.

BE5 denotes a volume slide control: the interpreter can alter the volume of the keynote speaker (lecturer B1, participant at the first endpoint; first audio stream). In the case of relay interpretation (interpreter interprets from the interpretation of another interpreter), the volume of the first interpretation can accordingly be regulated using control element BE5.

Finally, BE6 denotes a further slide control that the interpreter can use to adjust the frequency range used—in particular for the first audio stream arriving with him—so that he can understand everything clearly above his own voice.

The invention is in particular not restricted in respect of the type and number of control elements BE1-BE6.

The invention claimed is:

1. A videoconference system configured for two-way transmission of video and audio signals using streaming technology between at least three endpoints (EP1-EP3), each of the at least three endpoints comprises at least one of a transmission device or a reception device (SE) for at least one of audio streams (AS1, AS2, AS2") or video streams (VS1, VS2, VS2"), the system comprising:
  i. at least one first said endpoint (EP1) having at least one of the transmission devices (SE) for the at least one of audio streams or video streams;
  ii. at least one second said endpoint (EP2) having one of the reception devices (SE) for audio streams;

iii. at least one third said endpoint (EP3) having at least one of the transmission devices (SE) for audio streams and one of the reception devices (SE) for audio streams;

wherein
- a) the first endpoint (EP1) is connected to the second endpoint (EP2) and to the third endpoint (EP3), in order to transmit a first one of the audio streams (AS1) to the second endpoint (EP2) and to the third endpoint (EP3) using the transmission device (SE) for audio streams and to also transmit a first one of the video streams (VS1) to at least the second endpoint (EP2) using the transmission device (SE) for video streams;
- b) the second endpoint (EP2) includes a requesting device and is connected to the third endpoint (EP3), in order to selectively request a second one of the audio streams (AS2) from the third endpoint (EP3) using a request signal (AF) produced or producible by the requesting device and to receive said second audio stream from the third endpoint (EP3) using the reception device (SE), said second audio stream (AS2) being derived from the first audio stream (AS1);
- c) the third endpoint (EP3) is configured to receive the first audio stream (AS1) from the first endpoint (EP1) and the request signal (AF) from the second endpoint (EP2) and to take the request signal (AF) as a basis for producing the second audio stream (AS2) and transmitting the second audio stream to the second endpoint (EP2);
- d) the third endpoint (EP3) is configured to detect a reception of a further request signal (AF) at a further one of the third endpoints (EP3) and to take the further request signal (AF) as a basis for producing a further one of the second audio streams (AS2") and transmitting the further one of the second audio streams to the one of the second endpoints (EP2") from which the further request signal (AF) originated;

wherein there are a plurality of the third endpoints (EP3) that each provide different ones of the second audio streams (AS2, AS2"), and the second endpoint (EP2) is configured to selectively request a determined one of the second audio streams (AS2, AS2") by sending the request signal (AF) to a determined one of the third endpoints (EP3), such that a given one of the third endpoints (EP3) is configured to produce only one said second audio stream (AS2, AS2") at a given time, wherein at least one of the second audio stream (AS2) or the further second audio stream (AS2") is a simultaneous translation of the first audio stream (AS1).

2. The videoconference system as claimed in claim 1, wherein
the second endpoint (EP2) is configured to use the reception device (SE) to receive the first audio stream (AS1) and the second audio stream (AS2) at a same time and to use a reproduction device (SP) to output them at a same time.

3. The videoconference system as claimed in claim 2, wherein
the second endpoint (EP2) is configured to output the first audio stream (AS1) and the second audio stream (AS2) at different volumes.

4. The videoconference system as claimed in claim 1, wherein the third endpoint (EP3) is configured to transmit the second audio stream (AS2) only to the second endpoints (EP2) from which the request signal (AF) was received.

5. The videoconference system as claimed in claim 1, wherein
the second endpoint (EP2) is configured to use the requesting device (UI) to selectively cancel the second audio stream (AS2) at the third endpoint (EP3) using a termination signal (BE) produced or producible by the requesting device (UI), and the third endpoint (EP3) is configured to transmit the second audio stream (AS2) only to the second endpoints (EP2) from which no termination signal (BE) was received.

6. The videoconference system as claimed in claim 1, wherein
at least the second endpoint (EP2) additionally has one of the reception devices (SE) for video streams and at least the third endpoint (EP3) additionally has one of the transmission devices (SE) for video streams, said transmission device (SE) for video streams is configured to transmit a second one of the video streams (VS2) to the second endpoint (EP2) in parallel with the second audio stream (AS2) upon receiving the request signal (AF) from the second endpoint (EP2).

7. The videoconference system as claimed in claim 6, wherein
the second endpoint (EP2) is configured so as, before sending the request signal (AF), to use the reception device (SE) for the video streams to display an image (SB), said image (SB) displays an attribute of at least one of the third endpoint (EP3) or the second audio stream (AS2).

8. The videoconference system as claimed in claim 1, wherein
a number of the second audio streams (AS2, AS2") that are receivable at the second endpoint (EP2) at the same time is limited.

9. The videoconference system as claimed in claim 1, wherein
the third endpoint (EP3) includes a display device (DI) that displays a number of the second endpoints (EP2) from which the request signal (AF) was received and that receive the second audio stream (AS2) at a given time.

10. A non-transitory computer program product (CP) having program information stored on a physical data medium, the program information being configured to be implemented on a computer system having at least three endpoints (EP1-EP3), which are connected via communication channels and each of the at least three endpoints including at least one of a transmission device (SE) or a reception device (SE) for at least one of audio streams or for video streams, with the implementation forming the videoconference system for two-way transmission of video and audio signals as claimed in claim 1.

11. The videoconference system as claimed in claim 1, further comprising the third endpoint (EP3) muting the transmission of audio stream (AS2).

12. The videoconference system as claimed in claim 1, further comprising the third endpoint (EP3) establishing a private voice channel with another endpoint.

13. A method for transmitting information using streaming technology via communication channels between at least three endpoints (EP1-EP3), each of the at least three endpoints including at least one of a transmission device or a reception device (SE) for at least one of audio streams or for video streams, the method comprising:
  a) at least temporarily connecting a first one of the endpoints (EP1) to a second one of the endpoints (EP2) and to a third one of the endpoints (EP3) via an applicable one of the communication channels and transmitting a first audio stream (AS1) to the second endpoint (EP2) and to the third endpoint (EP3) using the transmission device (SE) for the audio streams, while the first endpoint (EP1) also transmits a first one of the video streams (VS1) to at least the second endpoint (EP2) using the transmission device (SE) for the video streams;
  b) at least temporarily connecting the second endpoint (EP2) to the third endpoint (EP3) via an applicable one of the communication channels, in order to selectively request a second one of the audio streams (AS2) from the third endpoint (EP3) using a request signal (AF) and to receive said second audio stream from the third endpoint (EP3), said second audio stream (AS2) being derived from the first audio stream (AS1);
  c) the third endpoint (EP3) receiving the first audio stream (AS1) from the first endpoint (EP1) and the request signal (AF) from the second endpoint (EP2) and, based on the request signal (AF), producing the second audio stream (AS2) from the first audio stream (AS1) and transmitting the second audio stream to the second endpoint (EP2);
  d) the second endpoint (EP2) outputting at least the second audio stream (AS2);
  e) the third endpoint (EP3) detecting the reception of a further request signal (AF) at a further one of the third endpoints (EP3) and taking the further request signal (AF) as a basis for producing a further one of the second audio streams (AS2") and transmitting the further one of the second audio streams to that second endpoint (EP2") from which the further request signal (AF) originated;
  wherein there are a plurality of the third endpoints (EP3) that each provide different ones of the second audio streams (AS2, AS2"), and the second endpoint (EP2) is configured to selectively request a determined one of the second audio streams (AS2, AS2") by sending the request signal (AF) to a determined one of the third endpoints (EP3), such that a given one of the third endpoints (EP3) produces only one of the second audio streams (AS2, AS2") at a given time, wherein producing at least one of the second audio stream (AS2) or the further second audio stream (AS2") includes a simultaneous translation of the first audio stream (AS1).

14. The method as claimed in claim 13, further comprising
  the second endpoint (EP2) receiving the first audio stream (AS1) and the second audio stream (AS2) at a same time and outputting the first audio stream (AS1) and the second audio stream (AS2) at a same time.

15. The method as claimed in claim 14, wherein
  the second endpoint (EP2) outputs the first audio stream (AS1) and the second audio stream (AS2) at different volumes, preferably the first audio stream (AS1) at a volume that is decreased in comparison with the second audio stream (AS2).

16. The method as claimed in claim 13, further comprising
  the third endpoint (EP3) transmitting the second audio stream (AS2) only to the second endpoints (EP2) from which the request signal (AF) was received.

17. The method as claimed in claim 13, further comprising
  the second endpoint (EP2) selectively cancelling the second audio stream (AS2) at the third endpoint (EP3) using a termination signal (BE), while the third endpoint (EP3) transmits the second audio stream (AS2) only to the second endpoints (EP2) from which no termination signal (BE) was received.

18. The method as claimed in claim 17, further comprising
  a user (B2) of the second endpoint triggering at least one of the request signal (AF) or the termination signal (BE).

19. The method as claimed in claim 13, further comprising
  the third endpoint (EP3), on receiving the request signal (AF) from the second endpoint (EP2), transmitting a second one of the video streams (VS2) to the second endpoint (EP2) in parallel with the second one of the audio streams (AS2).

20. The method as claimed in claim 19, further comprising
  the second endpoint (EP2), before sending the request signal (AF), displaying an image for the third endpoint (EP3), said image (SB) indicating an attribute of at least one of the third endpoint (EP3) or the second one of the audio streams (AS2).

21. The method as claimed in claim 13, further comprising
  Limiting a number of the second audio streams (AS2) received at the second endpoint (EP2) at a same time.

22. The method as claimed in claim 13, further comprising
  the third endpoint (EP3) displaying a number of the second endpoints (EP2) from which the request signal (AF) was received and that receive the second one of the audio streams (AS2) at a given time.

23. The method as claimed in claim 13, further comprising
  outputting the video stream (VS2) from a human translator together with the audio stream (AS2) of a human translation to a user (B2) of the second endpoint (EP2).

24. The method as claimed in claim 13, further comprising the third endpoint (EP3) muting the transmission of audio stream (AS2).

25. The method as claimed in claim 13 further comprising the third endpoint (EP3) establishing a private voice channel with another endpoint.

26. A videoconference system configured for two-way transmission of video and audio signals using streaming technology between at least three endpoints (EP1-EP3), each of the at least three endpoints comprises at least one of a transmission device or a reception device (SE) for at least one of audio streams (AS1, AS2, AS2") or video streams (VS1, VS2, VS2"), the system comprising:
  i. at least one first said endpoint (EP1) having at least one of the transmission devices (SE) for the at least one of audio streams or video streams;
  ii. at least one second said endpoint (EP2) having one of the reception devices (SE) for audio streams;
  iii. at least one third said endpoint (EP3) having at least one of the transmission devices (SE) for audio streams and one of the reception devices (SE) for audio streams;
  wherein
  a) the first endpoint (EP 1) is connected to the second endpoint (EP2) and to the third endpoint (EP3), in order to transmit a first one of the audio streams (AS1) to the second endpoint (EP2) and to the third endpoint (EP3) using the transmission device (SE) for audio streams and to also transmit a first one of the video streams (VS1) to at least the second endpoint (EP2) using the transmission device (SE) for video streams;

b) the second endpoint (EP2) includes a requesting device and is connected to the third endpoint (EP3), in order to selectively request a second one of the audio streams (AS2) from the third endpoint (EP3) using a request signal (AF) produced or producible by the requesting device and to receive said second audio stream from the third endpoint (EP3) using the reception device (SE), said second audio stream (AS2) being derived from the first audio stream (AS1);

c) the third endpoint (EP3) is configured to receive the first audio stream (AS1) from the first endpoint (EP1) and the request signal (AF) from the second endpoint (EP2) and to take the request signal (AF) as a basis for producing the second audio stream (AS2) and transmitting the second audio stream to the second endpoint (EP2);

d) an additional third endpoint (EP3') is configured to receive the second audio stream (AS2) from the third endpoint (EP3) and the request signal (AF) from the second endpoint (EP2) and to take the request signal (AF) as a basis for producing an additional second audio stream (AS2') and transmitting the second audio stream to the second endpoint (EP2);

e) the third endpoint (EP3) is configured to detect a reception of a further request signal (AF) at a further one of the third endpoints (EP3) and to take the further request signal (AF) as a basis for producing a further one of the second audio streams (AS2") and transmitting the further one of the second audio streams to the one of the second endpoints (EP2") from which the further request signal (AF) originated;

wherein there are a plurality of the third endpoints (EP3) that each provide different ones of the second audio streams (AS2, AS2"), and the second endpoint (EP2) is configured to selectively request a determined one of the second audio streams (AS2, AS2") by sending the request signal (AF) to a determined one of the third endpoints (EP3), such that a given one of the third endpoints (EP3) is configured to produce only one said second audio stream (AS2, AS2") at a given time, wherein at least one of the second audio stream (AS2) or the further second audio stream (AS2") is a simultaneous translation of the first audio stream (AS1).

* * * * *